US011481493B2

(12) United States Patent
Pizano et al.

(10) Patent No.: US 11,481,493 B2
(45) Date of Patent: Oct. 25, 2022

(54) SYSTEMS AND METHODS FOR GENERATING AN INVENTORY OF SOFTWARE APPLICATIONS FOR OPTIMIZED ANALYSIS

(71) Applicant: Verizon Patent and Licensing Inc., Arlington, VA (US)

(72) Inventors: Ignacio D. Pizano, Irvine, CA (US); Stephen Pettit, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 110 days.

(21) Appl. No.: 16/696,254

(22) Filed: Nov. 26, 2019

(65) Prior Publication Data
US 2021/0157915 A1 May 27, 2021

(51) Int. Cl.
*G06F 21/51* (2013.01)
*G06F 21/56* (2013.01)
*G06F 16/13* (2019.01)

(52) U.S. Cl.
CPC .......... *G06F 21/563* (2013.01); *G06F 16/137* (2019.01); *G06F 21/51* (2013.01); *G06F 21/565* (2013.01)

(58) Field of Classification Search
CPC .... G06F 21/563; G06F 16/137; G06F 21/565; G06F 21/51; G06F 21/64
See application file for complete search history.

(56) References Cited

U.S. PATENT DOCUMENTS

| | | | | |
|---|---|---|---|---|
| 8,806,625 B1* | 8/2014 | Berger | ................. | H04L 9/3247 726/13 |
| 9,292,689 B1* | 3/2016 | Chuo | .................... | G06F 21/562 |
| 2006/0218637 A1* | 9/2006 | Thomas | ................. | G06F 21/51 726/23 |
| 2009/0158432 A1* | 6/2009 | Zheng | .................... | G06F 21/53 726/24 |
| 2013/0298117 A1* | 11/2013 | Reynolds | .............. | G06F 16/182 717/173 |
| 2016/0179828 A1* | 6/2016 | Ellis | ...................... | G06F 16/122 707/695 |

(Continued)

OTHER PUBLICATIONS

"File Scan Based on Hash"—Spiceworks, Mar. 12, 2018 https://community.spiceworks.com/topic/2119889-file-scan-based-on-hash (Year: 2018).*

(Continued)

*Primary Examiner* — Randy A Scott

(57) ABSTRACT

A device may receive data identifying applications, wherein each application includes files and each file includes functions and lines of code. The device may generate file hashes for the files, line hashes for the lines of code, and function hashes for the functions. The device may store, in a data structure, data identifying one or more of the applications, the files, the lines of code, the functions, the file hashes, the line hashes, and the function hashes. When scanning a new application, the device may generate a hash associated with one of the files of the new application, and may determine that the hash associated with the file of the new application matches one of the file hashes. The device may refrain from performing a scan of the file of the new application based on determining that the hash of the file matches one of the file hashes.

20 Claims, 15 Drawing Sheets

(56) References Cited

U.S. PATENT DOCUMENTS

2018/0060224 A1* 3/2018 Shavro ............... G06F 11/3684

OTHER PUBLICATIONS

"Searching for Hashes of Malicious Files"—James Tarala, Audit Scripts, Feb. 15, 2010 https://www.auditscripts.com/searching-for-hashes-of-malicious-files-apt-aurora/ (Year: 2010).*

* cited by examiner

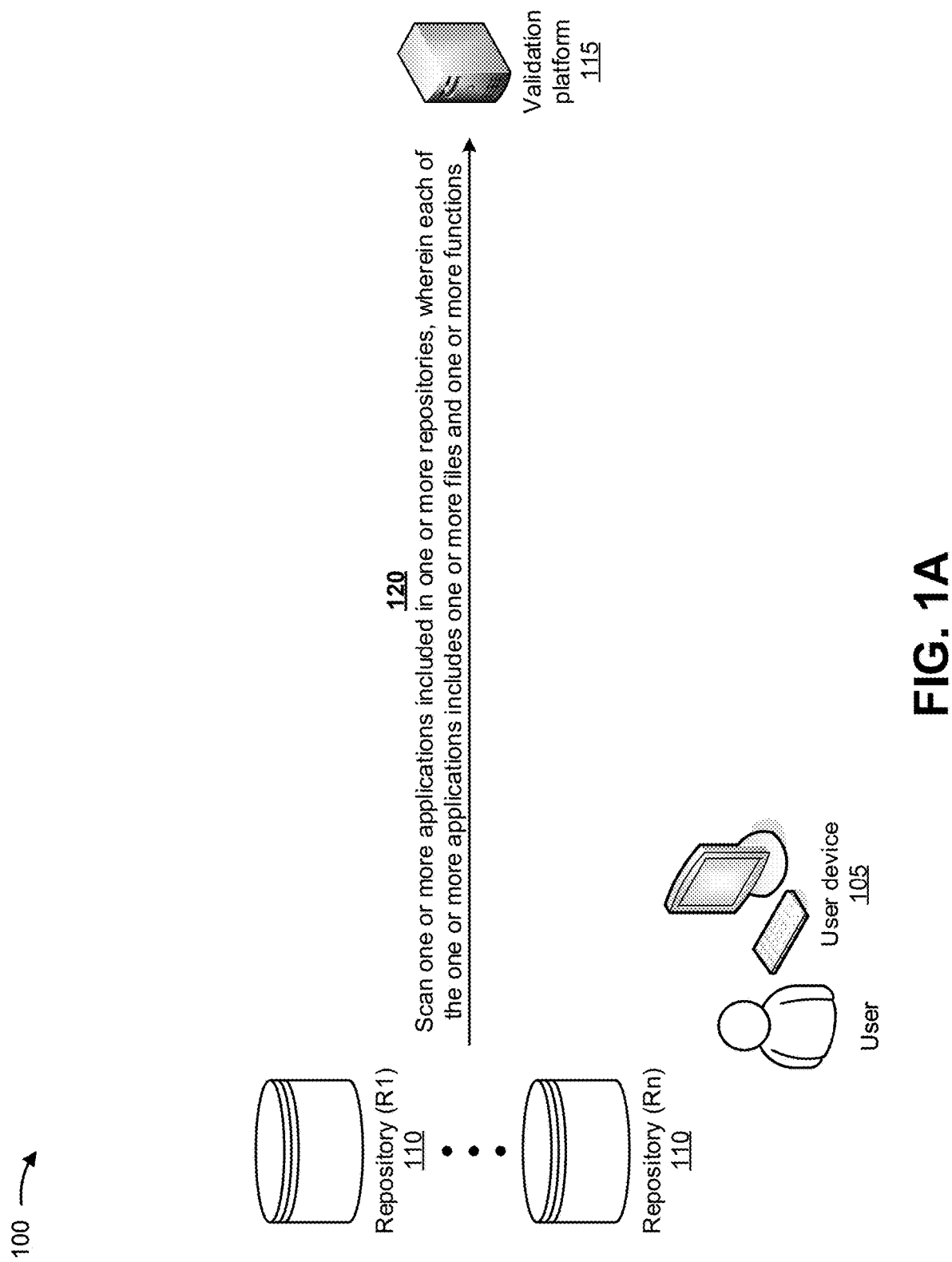

| Repository | Application | File | Scanned | Approved | File hash value | File line hash value |
|---|---|---|---|---|---|---|
| R1 | App-a<br>App-z | Filename-1<br>Filename-n | 0 | No | Hash-1<br>Hash-n | Line 1 hash<br>Line n hash |
| R2 | App-a<br>App-z | Filename-1<br>Filename-n | 1 | Yes | Hash-1<br>Hash-n | Line 1 hash<br>Line n hash |
| R3 | App-a<br>App-z | Filename-1<br>Filename-n | 2 | Yes | Hash-1<br>Hash-n | Line 1 hash<br>Line n hash |
| *** | *** | *** | *** | *** | *** | *** |
| Rn | App-a<br>App-z | Filename-1<br>Filename-n | 3 | No | Hash-1<br>Hash-n | Line 1 hash<br>Line n hash |

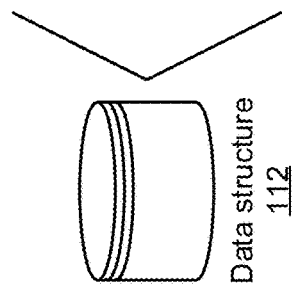

Data structure 112

FIG. 1F

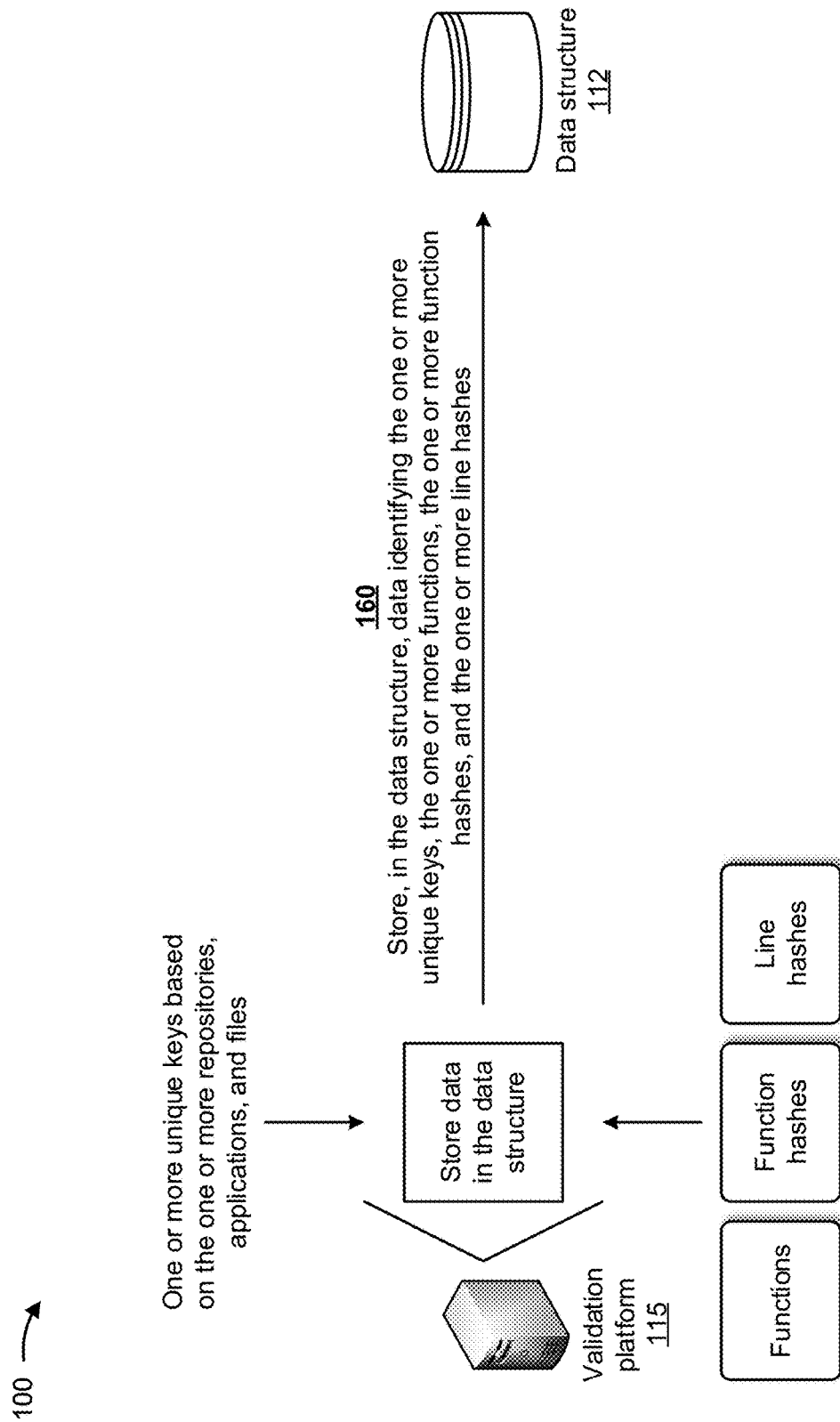

| Unique key | Function | Scanned | Approved | Function hash value | Function line hash value |
|---|---|---|---|---|---|
| Key1 | FuncName-1<br>FuncName-n | 0 | Yes | FuncHash-1<br>FuncHash-n | Func line 1 hash<br>Func line n hash |
| Key2 | FuncName-1<br>FuncName-n | 1 | No | FuncHash-1<br>FuncHash-n | Func line 1 hash<br>Func line n hash |
| Key3 | FuncName-1<br>FuncName-n | 2 | Yes | FuncHash-1<br>FuncHash-n | Func line 1 hash<br>Func line n hash |
| *** | *** | *** | *** | *** | *** |
| Keyn | FuncName-1<br>FuncName-n | 3 | No | FuncHash-1<br>FuncHash-n | Func line 1 hash<br>Func line n hash |

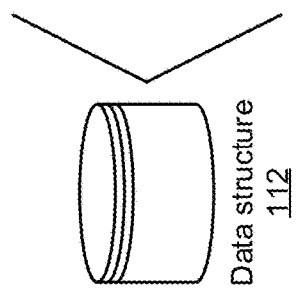

Data structure 112

FIG. 1K

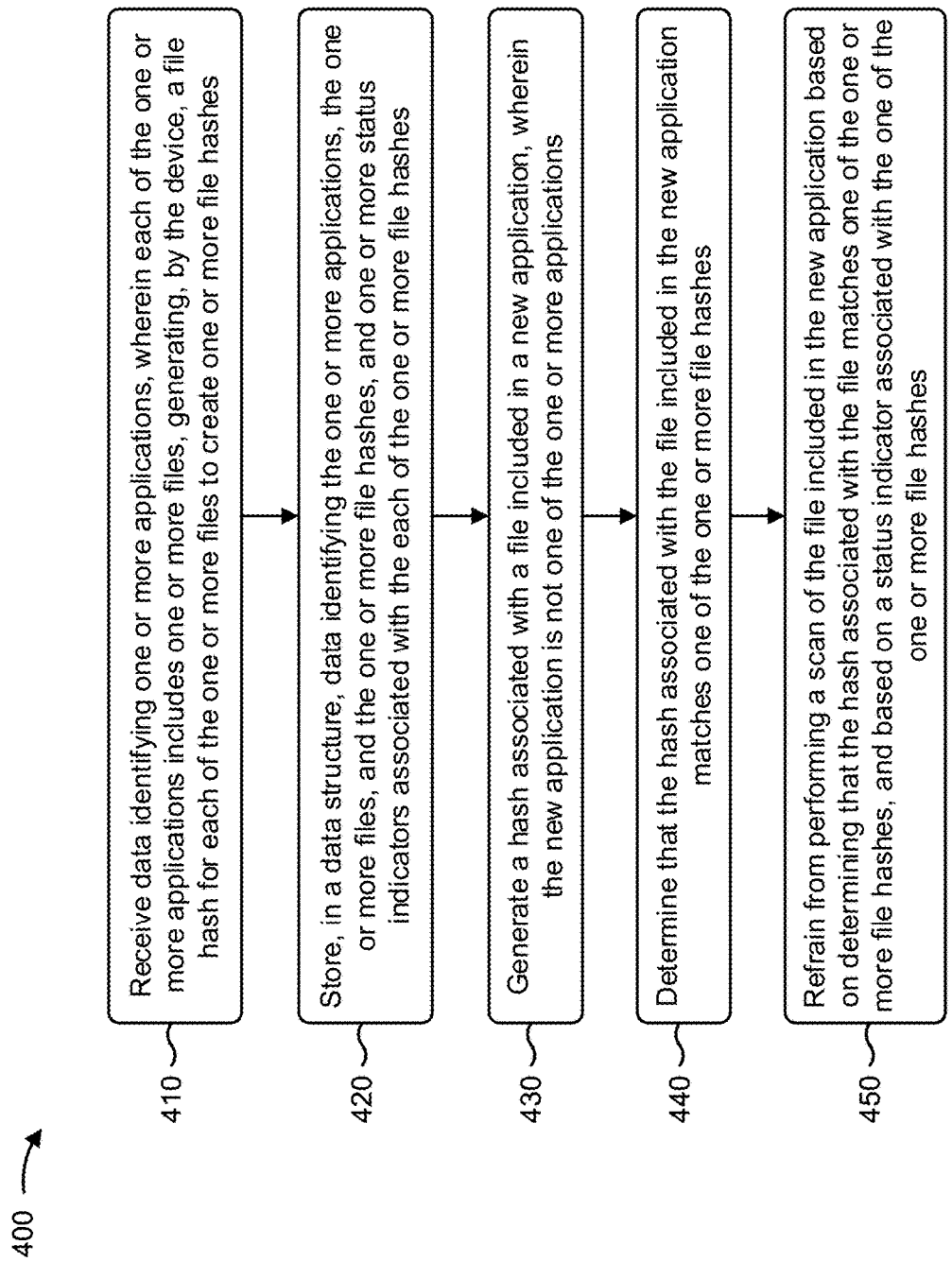

SYSTEMS AND METHODS FOR GENERATING AN INVENTORY OF SOFTWARE APPLICATIONS FOR OPTIMIZED ANALYSIS

BACKGROUND

Software developers may generate applications that include multiple files, and each file may include multiple functions and/or multiple lines of code. A software developer may share an application with other software developers, and the other software developers may use the application (or some portion of it) in their own applications, and may further modify the application and share the modified application with still other developers. Thus, the application may be executed and utilized by different divisions of an entity.

BRIEF DESCRIPTION OF THE DRAWINGS

FIGS. 1A-1L are diagrams of one or more example implementations described herein.

FIG. 4 is a flow chart of an example process for generating an inventory of files and functions and for tracking changes to the files and the functions.

DETAILED DESCRIPTION OF PREFERRED EMBODIMENTS

Figure 1B:
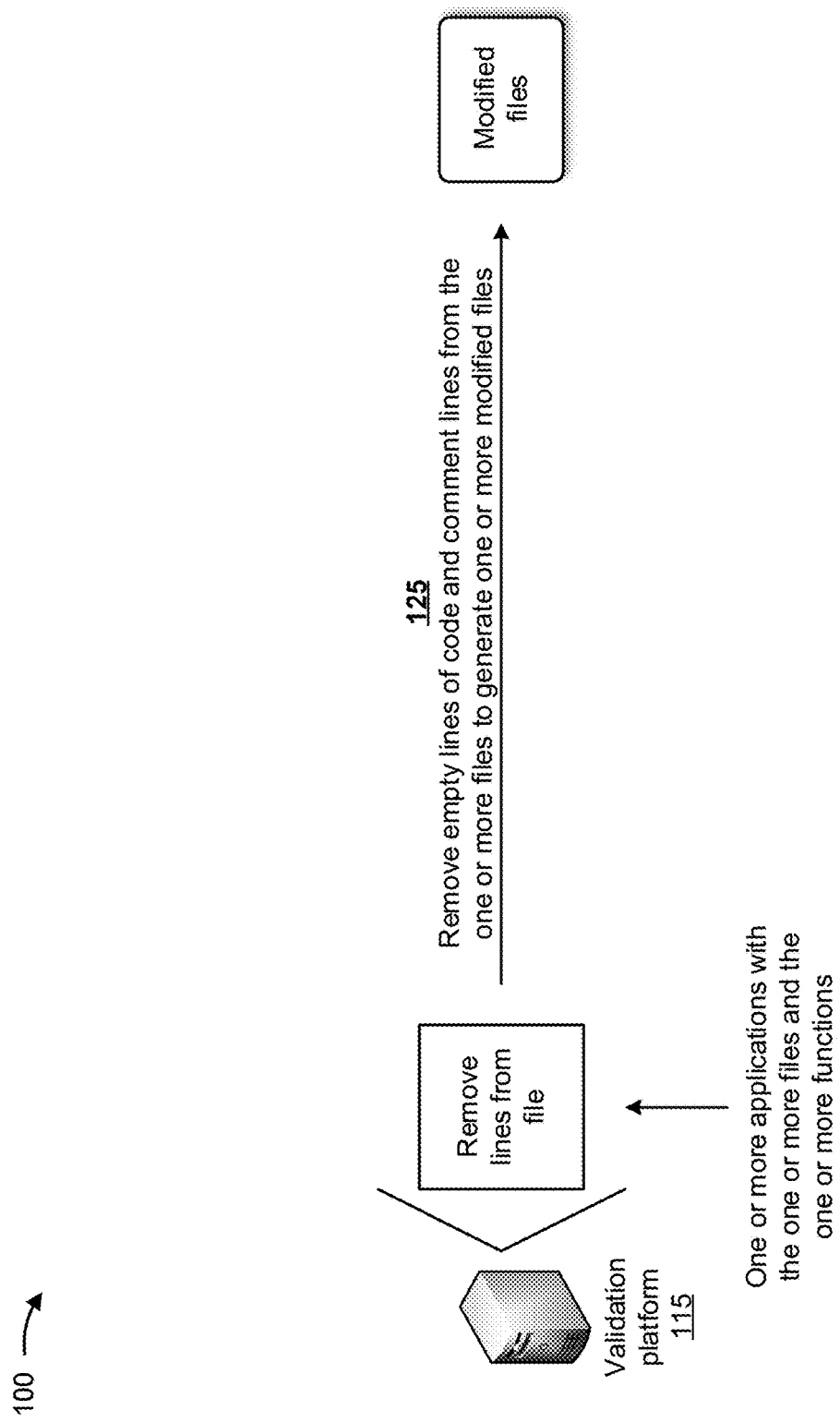

The following detailed description of example implementations refers to the accompanying drawings. The same reference numbers in different drawings may identify the same or similar elements.

As used herein, the term "application," may be used to refer to a grouping of software used to perform one or more actions. As such, an application can include software groupings that may be referred to as applications, apps, libraries, scripts, templates, or other similar nomenclature. As used herein, a first application may be "included" in a second application if the second application uses one or more of the files of the first application during its assembly or execution. For example, the first application may be included in the second application when a copy of files of the first application are used by the second application when it is compiled, linked, built or other process by which the second application is made executable. Likewise, the first application may be included in the second application when the files of the first application are retrieved from a separate repository and used by the second application as noted above.

An application may be expressed as one or more files of software code, and the software code may be expressed using various coding constructs depending on the particular coding language used. For example, a coding language in contemporaneous use with the current application is JavaScript, and the JavaScript uses coding constructs such as functions to implement the desired actions of the application. As another example, another coding language in contemporaneous use with the current application is Java, and Java uses coding constructs such as classes and objects to implement the desired actions of the application. As used herein, the term "function" may be used to describe various coding constructs that may be used in software code to implement desired actions, and includes class definitions, function definitions, or other component definitions provided in software code.

Applications executed and utilized by different divisions of an entity may be periodically analyzed (e.g., via a static code analysis or "scanning") to ensure compliance with security standards of the entity. Currently, the applications are manually scanned via the static code analysis. However, since applications may be shared and modified as part of other applications, an application that is used across the entity in multiple applications may be scanned multiple times, and particularly if modified versions of the shared application are used (e.g., which may appear different than the original shared application to scanning tools). Furthermore, current software analysis techniques fail to provide an indication of whether an application or a modified version of an application has been previously scanned, and frequently identify code as having a potential security issue when in fact when analyzed in more detail, there is no security issue or the security issue is minimal or irrelevant. Thus, current software code analysis techniques waste computing resources (e.g., processing resources, memory resources, communication resources, and/or the like), networking resources, human resources, and/or the like associated with unnecessarily scanning the same shared application multiple times, unnecessarily scanning modified versions of the application multiple times, failing to indicate that the application has been previously scanned, investigation of non-existent security issues, and/or the like. When applications become large and/or the quantity of applications becomes large, these inefficiencies become significant limitations on software development activities and security monitoring activities.

Some implementations described herein provide a validation platform that generates an inventory of files and/or functions of applications and tracks changes to the files and/or the functions. For example, the validation platform may receive, from one or more repositories, data identifying one or more applications, where each of the one or more applications may include one or more files, and each of the one or more files may include one or more functions and one or more lines of code. The validation platform may generate a file hash for each of the one or more files to create one or more file hashes. In some implementations the validation platform additionally or alternatively may generate a line hash for each of the one or more lines of code, of each of the one or more files. In some implementations the validation platform additionally or alternatively may generate a function hash for each of the one or more functions, of each of the one or more applications. The validation platform may store, in a data structure, data identifying the one or more repositories, the one or more applications, the one or more files, the one or more lines of code, the one or more file hashes, the one or more line hashes (if used), and the one or more function hashes (if used). The data structure may further store one or more status indicators associated with the files and/or functions, which may reflect a status associated with the security of the files and/or functions.

When doing an analysis of a second application that includes a first application, the validation platform may generate a hash for each of the files of the first application, and may determine that one or more of the hashes of the files of the first application matches the one or more file hashes. When matches exist, the validation platform may take an optimized action—for example, a more efficient, accurate and/or timely action—in its processing of the files of the first application included in the second application whose hashes matches the one or more file hashes, and based on the one or more status indicators. Where no match is found, files of the first application may be processed according to the normal analysis. In such cases, the results of the analysis may be stored in the data structure with the file hash, such that they may be matched against future analyses. Likewise, the validation platform can perform analysis based on functions, such that function hashes may be used as described above to take a more optimized action in its processing of the functions of the first application included in the second application.

In some implementations, the validation platform may generate hashes for each line of a file of the first application (for example, for every file, or only when a hash of the file is not present in the one of more file hashes). The hashes of each line of the file of the first application may be compared to the line hashes associated with the one or more files to identify lines that are different between files, to aid in determining where changes may exist. In some implementations, the use of line hashes may be by functions, such that hash values for the lines of functions are compared.

In this way, the validation platform generates an inventory of files and/or functions of applications and tracks changes to the files/functions so that a previously scanned application is not scanned multiple times, including when it is included in other applications. Unlike current techniques, the validation platform prevents scanning of the same application multiple times, and provides an indication of whether an application has been previously scanned. Thus, the validation platform conserves computing resources, networking resources, human resources, and/or the like that would otherwise be wasted in unnecessarily scanning the same application multiple times due to its inclusion in other applications (either in original or modified versions), failing to identify or indicate that the application has been previously scanned, repeated investigation of non-existent security issues, and/or the like.

FIGS. 1A-1L are diagrams of one or more example implementations 100 described herein. As shown in FIG. 1A, a user device 105 may be associated with a user, multiple repositories 110 (e.g., geographically dispersed repositories R1 through Rn), and a validation platform 115. User device 105 may include a mobile device, a computer, a telephone, a set-top box, and/or the like that the user may utilize to interact with and/or retrieve information from repositories 110. Repositories 110 may store multiple applications for use by an entity. Each application may include one or more files and one or more functions that cause each application to perform specific operations. Each file and each function may include one or more lines of software code. Validation platform 115 may include a platform that generates an inventory of the files of the applications, and tracks changes to the files. In some implementations, validation platform 115 may additionally, or alternatively, generate an inventory of the functions of the applications and track changes to the functions.

As further shown in FIG. 1A, and by reference number 120, validation platform 115 may scan one or more applications included in one or more repositories R1 through Rn (e.g., repositories 110), wherein each of the one or more applications may include one or more files and one or more of functions. In some implementations, validation platform 115 may scan one or more repositories 110, and may retrieve data identifying the one or more applications, the one or more files, and, in some implementations, the one or more functions, based on scanning one or more repositories 110. Each of the one or more files may include one or more lines of code, and each of the one or more functions may include one or more lines of code. In some implementations, the user may utilize user device 105 to cause the scan of the one or more applications included in one or more repositories 110, and to cause the data identifying the one or more applications, the one or more files, and, in some implementations, the one or more functions to be provided to validation platform 115.

As shown in FIG. 1B, and by reference number 125, in some implementations, validation platform 115 may remove non-operable portions of code, such as empty lines of code and comment lines (e.g., or comments provided in portions of lines) from the one or more files to generate one or more modified files. For example, validation platform 115 may parse the content of each of the one or more files to identify blank spaces or characters that are not part of substantive code, to identify subsequent characters that indicate comments, and/or the like. Validation platform 115 may remove the blank spaces and/or the characters to generate a modified file for each of the one or more files. In this way, validation platform 115 may modify the one or more files to generate one or more modified files that are limited to substantive code. This may enable validation platform 115 to more accurately, quickly and easily compare application files to identify files that have identical substantive code (and be able to avoid identifying files as modified where the only changes are to comments, readability, or other cosmetic and non-substantive changes).

Figure 1C:
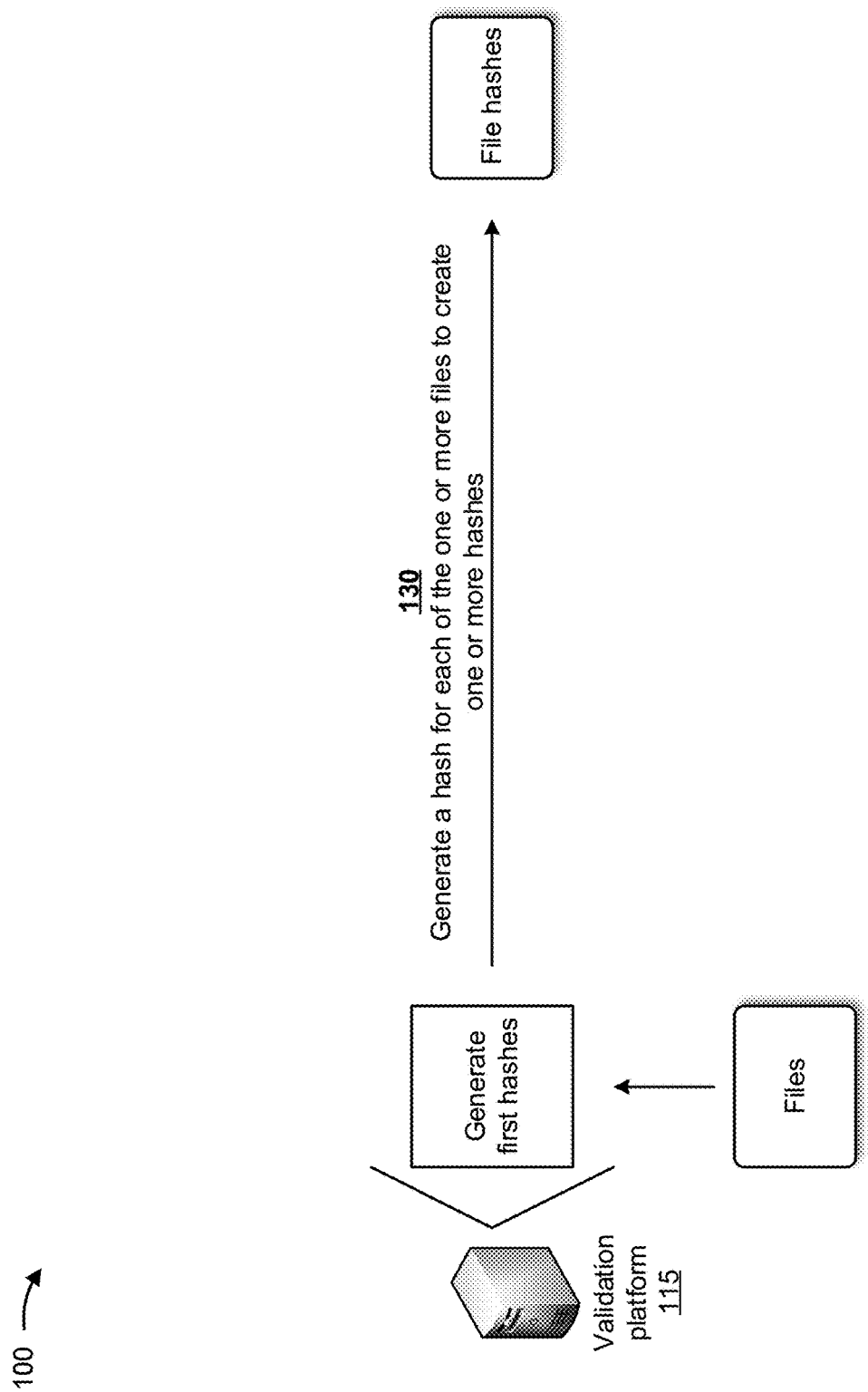

As shown in FIG. 1C, and by reference number 130, validation platform 115 may generate a file hash for each of the files to create a file hash value for each file. In some implementations, validation platform 115 may apply a hash function to each particular file to generate the file hash (e.g., a signature value) that is unique to the content of the particular file. For example, if a first file of the one or more files has different content than a second file of the one or more files, the file hash value of the first file will be different than the file hash value of the second file.

In some implementations, where files have been modified through the removal of non-operable code, the modified files may be used to calculate the file hash values. For example, if a first modified file is based on a first file, of the one or more files, and a second modified file is based on a second file, of the one or more files, that has different comments from the first file but identical substantive code to the first file, the first modified file and the second modified file may result in the same first hash value (e.g., a same signature) that is unique to the identical content. As another example, if a third modified file is based on a third file and the third file has different substantive code from the first file (e.g., even if the third file has identical comments to the first file), the first modified file and the third modified file will not include identical content, and will therefore result in different first hash values when applying the hash function to the files. This capability may be useful to allow for analysis optimization where the only differences between files is non-operable changes to the file (e.g., further commenting or white space adjustments to improve readability).

Figure 1D:
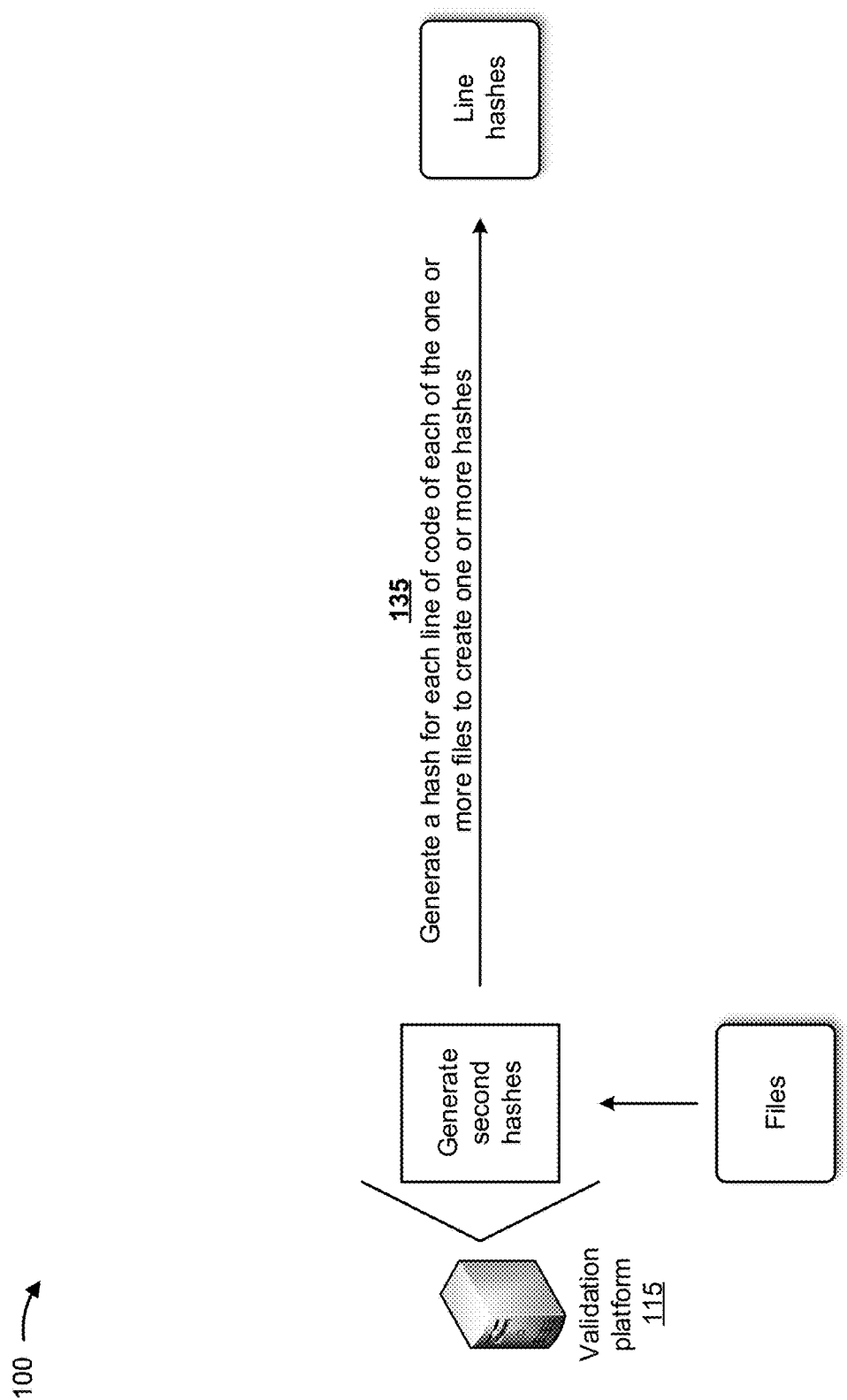

As shown in FIG. 1D, and by reference number 135, in some implementations, validation platform 115 may generate a line hash value for each line of code of each of the one or more files in the application to create one or more line hashes. For example, validation platform 115 may apply a hash function to each particular line of code of each file to generate a line hash value that is unique to the content of the particular line of code. Thus, if a first line of code of a file is different than a second line of code of the file, a file hash resulting from the first line of code will be different than a file hash resulting from the second line of code. In some implementations, the calculation used to generate the line hash value may be different than the calculation used to generate the file hash value. In some implementations, the modified files described above in connection with FIG. 1B may be used to generate the line hash values, such that non-operable code is removed prior to generating the line hash values.

Figure 1E:
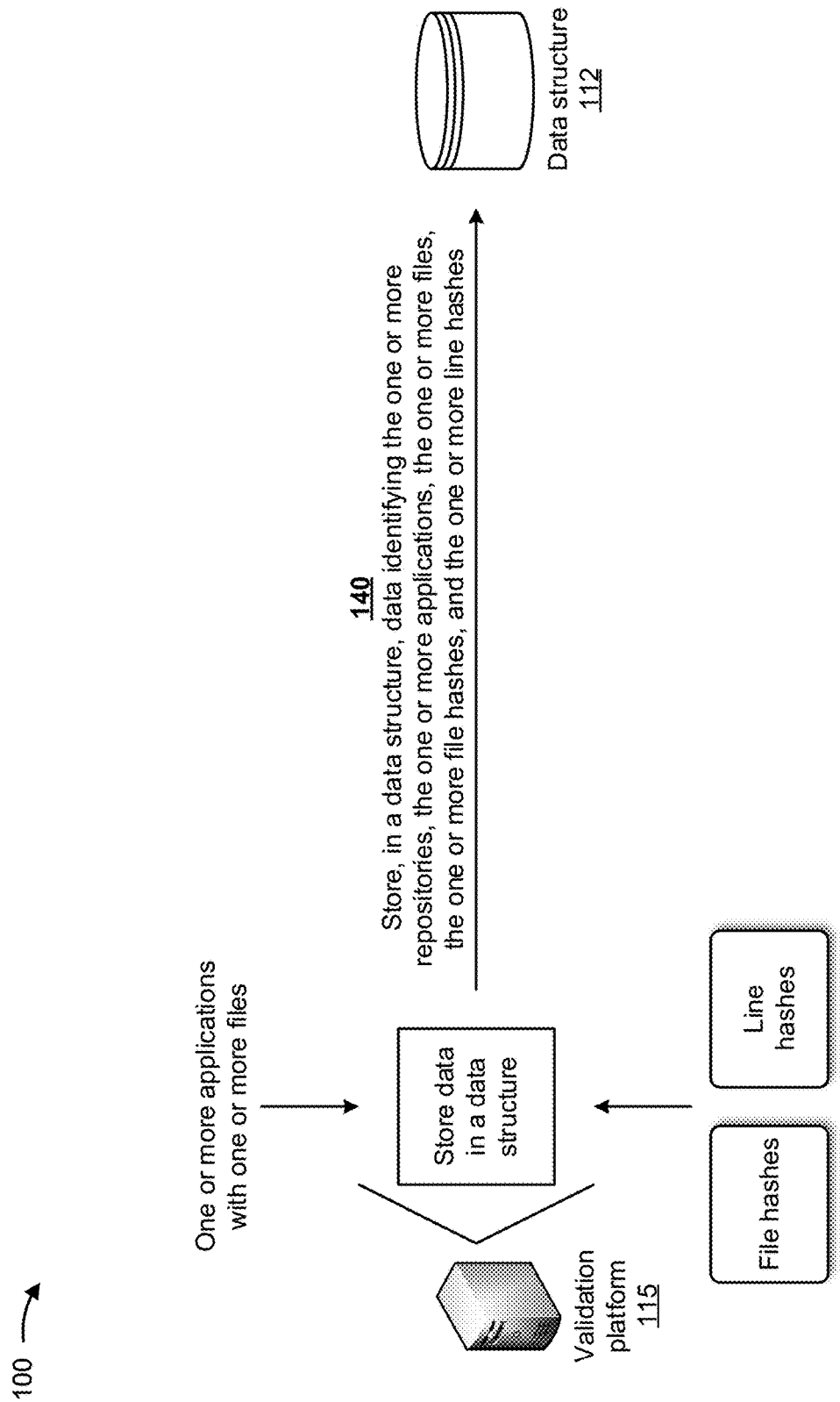

As shown in FIG. 1E, and by reference number 140, validation platform 115 may store, in data structure 112, data identifying one or more repositories 110, the one or more applications, the one or more files, the one or more file hashes, and (if used) the one or more line hashes. In some implementations, data structure 112 may be stored in one or more of one or more repositories 110, as shown in FIG. 1A. Alternatively, data structure 112 may be separate from one or more repositories 110. In some implementations, validation platform 115 may also store, in data structure 112, data identifying whether the one or more applications have been scanned, whether the one or more files have been scanned, whether the one or more applications are approved for use, whether the one or more files are approved for use, and/or the like.

As shown in FIG. 1F, an example data structure 112 may include entries for one or more repositories 110 (e.g., in a Repository column), the one or more applications (e.g., in an Application column), the one or more files (e.g., in a File column), the one or more file hashes (e.g., in a File hash value column) and (if used) the one or more line hashes (e.g., in a File line hash value column), and status information entries such as data identifying whether the one or more files have been scanned (e.g., in a Scanned column) and data identifying whether the one or more applications are approved for use (e.g., in an Approved column). For example, the Repository column may include entries for repository information for repositories R1 through Rn; the Application column may include entries for application information for applications App-a through App-z associated with the one or more applications; the File column may include entries for file information for files Filename-1 through Filename-n associated with the one or more files included in each application; the Scanned column may include entries for scanned indicators indicating whether, how and/or when each file was scanned (e.g., enumerated values, dates, Boolean flags); the Approved column may include entries for approval indicators indicating whether each file is approved to be used (e.g., enumerated values, Boolean flags such as Yes or No); the File hash value column may include entries for file hash information for the file hashes for each file (e.g., Hash-1 through Hash-n); and the File line hash value column may include entries for file line hash information for the line hashes for each line of each file (e.g., Line 1 hash through Line n hash). Other entries may also be included in data structure 112 such that useful information can be associated with each application, file and or line (e.g., notes, change logs, and the like).

In some implementations, data structure 112 may be implemented as a database (e.g., a relational database) having multiple tables associated with one or more of the data types described above. For example, a table of file hash values with associated file information, application information, repository information, status information may be included, as well as other related tables for file line hashes, application information, repository information, and the like. In some implementations, the data structure may be in multiple structured data elements (e.g., flat files, objects) allowing for accurate retrieval of the stored information. In some implementations, the data structure may include indexes that permit fast lookups based on application information, file information and/or hash values.

In some implementations, the application information may include information such as application names, version numbers, release dates, owner information, and other information about the application. In some implementations, the file information may include information such as file names, file types, language names, version numbers, last modified dates, directory information, owner information, and other information about the file. In some implementations, the hash value information may include the hash values, the date the hash value was generated, the algorithm used to generate the hash value, and other information about the hash values.

In some implementations, the scanned indicators may indicate whether files have been scanned and/or may indicate tools that were used to scan the files. For example, a scanned indicator of "0" may indicate that a file has not been scanned, a scanned indicator of "1" may indicate that the file has been scanned by a first static code analysis tool, a scanned indicator of "2" may indicate that the file has been scanned by a second static code analysis tool, a scanned indicator of "3" may indicate that the file has been scanned by a third static code analysis tool, a scanned indicator of "4" may indicate that the file has been scanned by a combination of the first static code analysis tool and the second static code analysis tool, and/or the like. In some implementations, a date value is included to indicate when a scan has been performed, which may be useful where new vulnerabilities are later discovered and it may be desirable to rescan certain applications that have not been recently scanned. In some implementations, the scanned indicators may be protected such that only an individual with security clearance may input or modify the scanned indicators, and such actions are logged for auditing. Additionally, or alternatively, validation platform 115 may automatically enter or modify the scanned indicators based on the results of the scan.

In some implementations, the approval indicators may indicate whether files are approved for use. For example, if an approval indicator for a particular file is set to "Yes," then validation platform 115 may assume that the file is safe to be used in any application that includes it, and may automatically set to "Yes" the approval indicators for all files included in other applications that have the same first hash as the particular file. In some implementations, the approval indicators may include information on what kind of approval is given (e.g., internal only, any application, special case review, and the like) and/or what is the basis for the approval (e.g., machine scan, human analysis). The approval indicator may also include a date field to indicate the date of an approval of use. Dates may be useful if new use cases for the software emerge or changes in security sensitivities are made in the future, requiring reassessment of the approval. In some implementations, the approval indicators may be protected such that only an individual with security clearance may input or modify the approval indicators, and such actions are logged for auditing. Additionally, or alternatively, validation platform 115 may automatically enter or modify the approval indicators, for example, based on the results of the scan.

In some implementations, data structure 112 may include entries for status information that note reasons for non-approval and/or remedial actions that may be taken to resolve security issues identified. For example, a file may be identified as containing a vulnerability. The record in the data structure 112 associated with the file may include scanning indicators that may indicate a scan has been performed and/or approval indicators that may indicate that the file may not be used. The record may also include an entry that notes the reason for the non-approval (e.g., the presence of the vulnerability) and/or a remedial action that can be taken (e.g., replacement of the file with an updated version of the file that fixes the issue).

In some implementations, validation platform 115 may, periodically or on request, scan one or more repositories 110 for code analysis, retrieve application files, calculate hashes, and determine whether the hashes match those hashes stored in data structure 112. Validation platform 115 may take an optimized action where the hashes match, and may conduct a normal scan when the hashes do not match. The scanning process will be described further below.

Figure 1G:
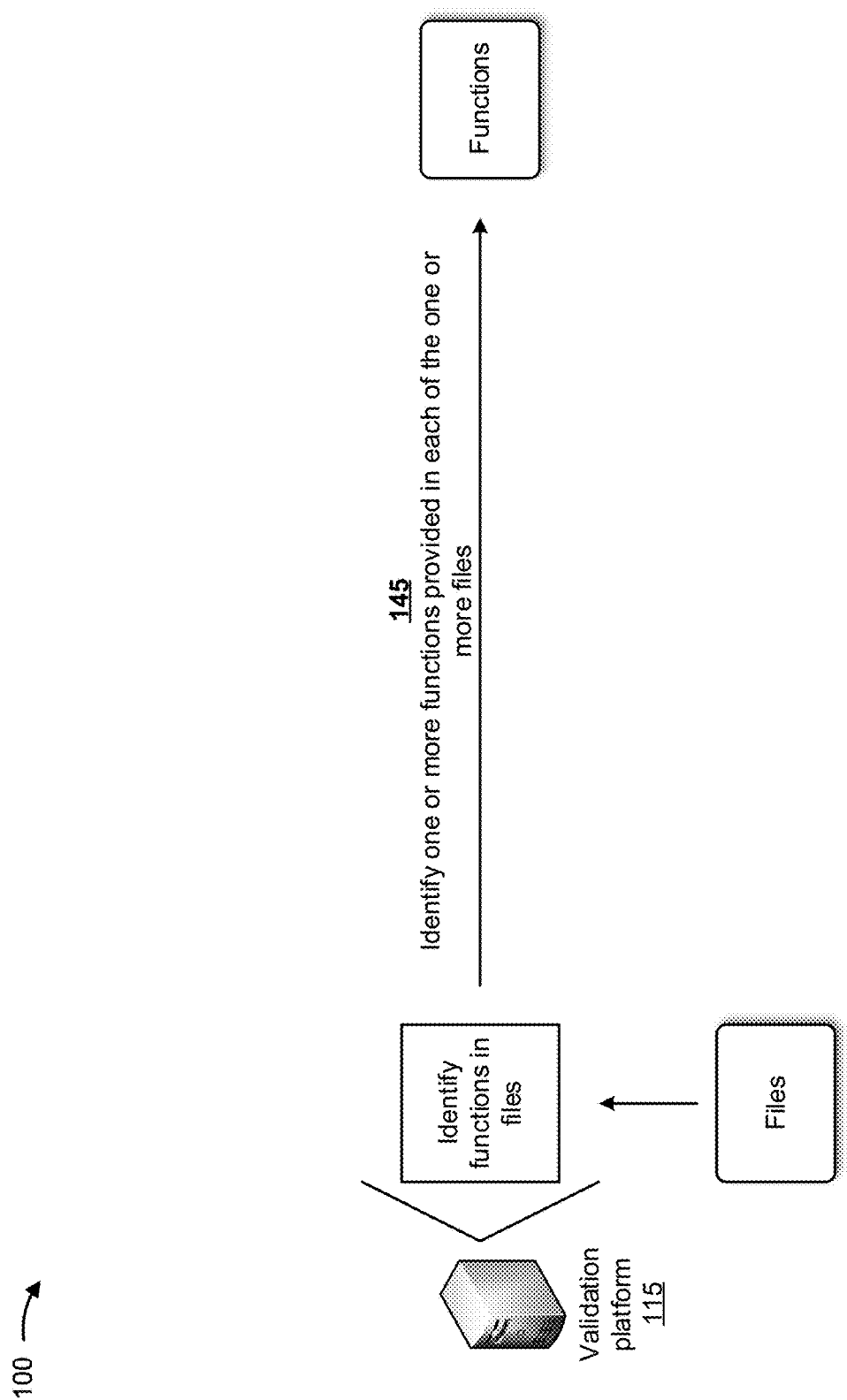

As shown in FIG. 1G, and by reference number 145, in some implementations, validation platform 115 may identify one or more functions provided in each of the files. In some implementations, validation platform 115 may read each of the files, and may parse each of the files based on functions. For example, validation platform 115 may parse the content of each of the files to determine function identifiers such as identify function names, function declarations, function signatures and/or the like, and may identify (e.g., reference, index, store, and/or the like) sections of code that define the function operations, structure and the like, to identify the one or more functions. In some implementations, validation platform 115 may remove the function names from the functions or may disregard the function names before generating hashes for the functions, as described below. In some implementations, validation platform 115 may reduce the one or more functions to just the function operations, structure and the line (e.g., operational portions of the functions), such that functions with identical operations may include identical content.

Figure 1H:
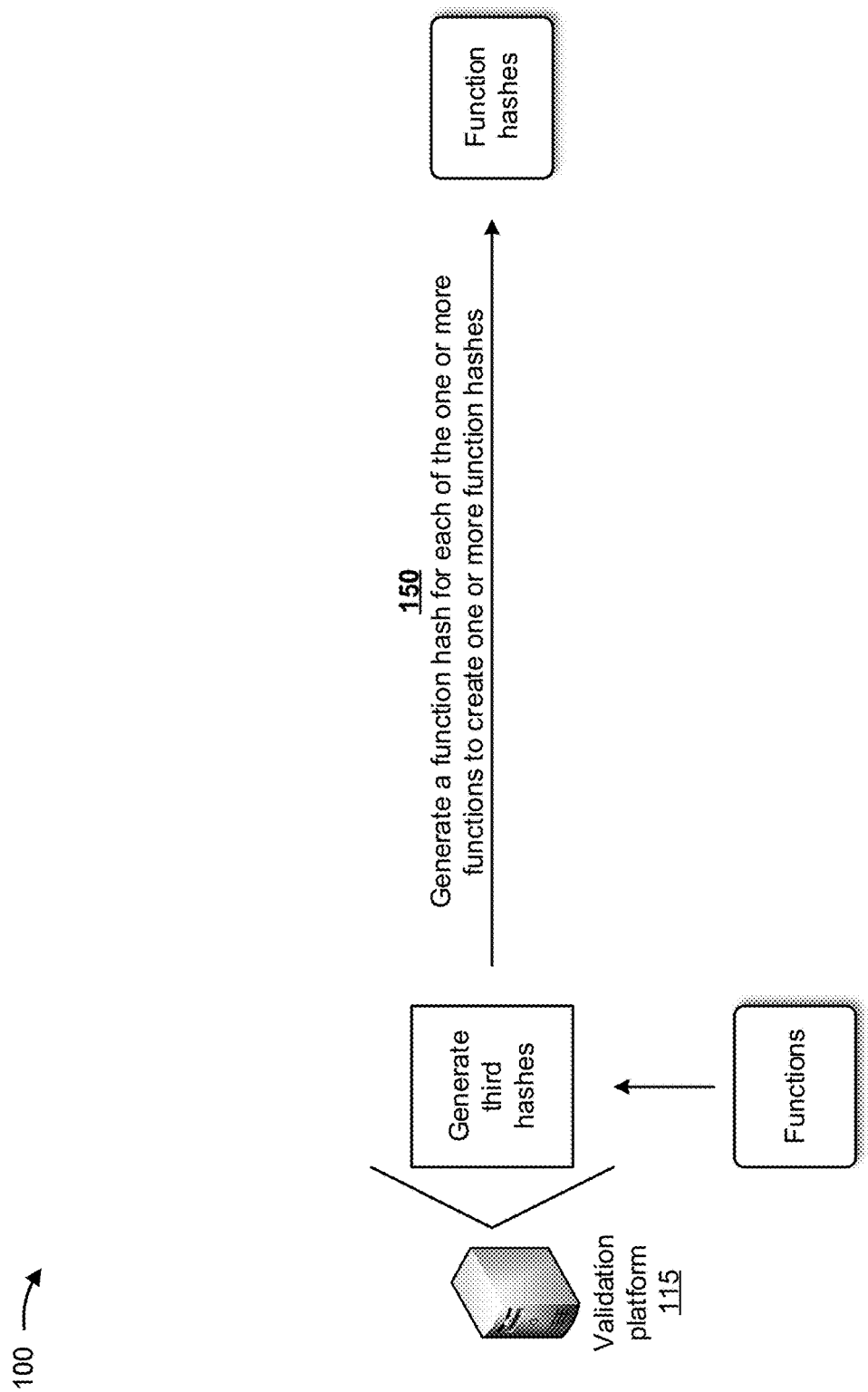

As shown in FIG. 1H, and by reference number 150, validation platform 115 may generate a function hash for each of the functions, to create one or more function hash values. In some implementations, validation platform 115 may apply a hash function to each particular function to generate a function hash that is unique to the content of the particular function. In some implementations, validation platform 115 may calculate a hash value without using the function identifiers, and only use the function operations defined by the function. For example, if a first function and a second function include identical function operations (e.g., even if the first function and the second function include different function names in the one or more files), the first function and a second function may therefore result in a same function hash value (e.g., a same signature value) that is unique to the identical function operations. As another example, if the first function and a third function have different function operations (e.g., even if the first function and the second function include identical function names in the one or more files), the first function and the third function will result in different function hashes. In some implementations, validation platform 115 may remove non-operable content from the function code (e.g., comments, white spaces, etc.) prior to calculating a function hash value.

Figure 1I:
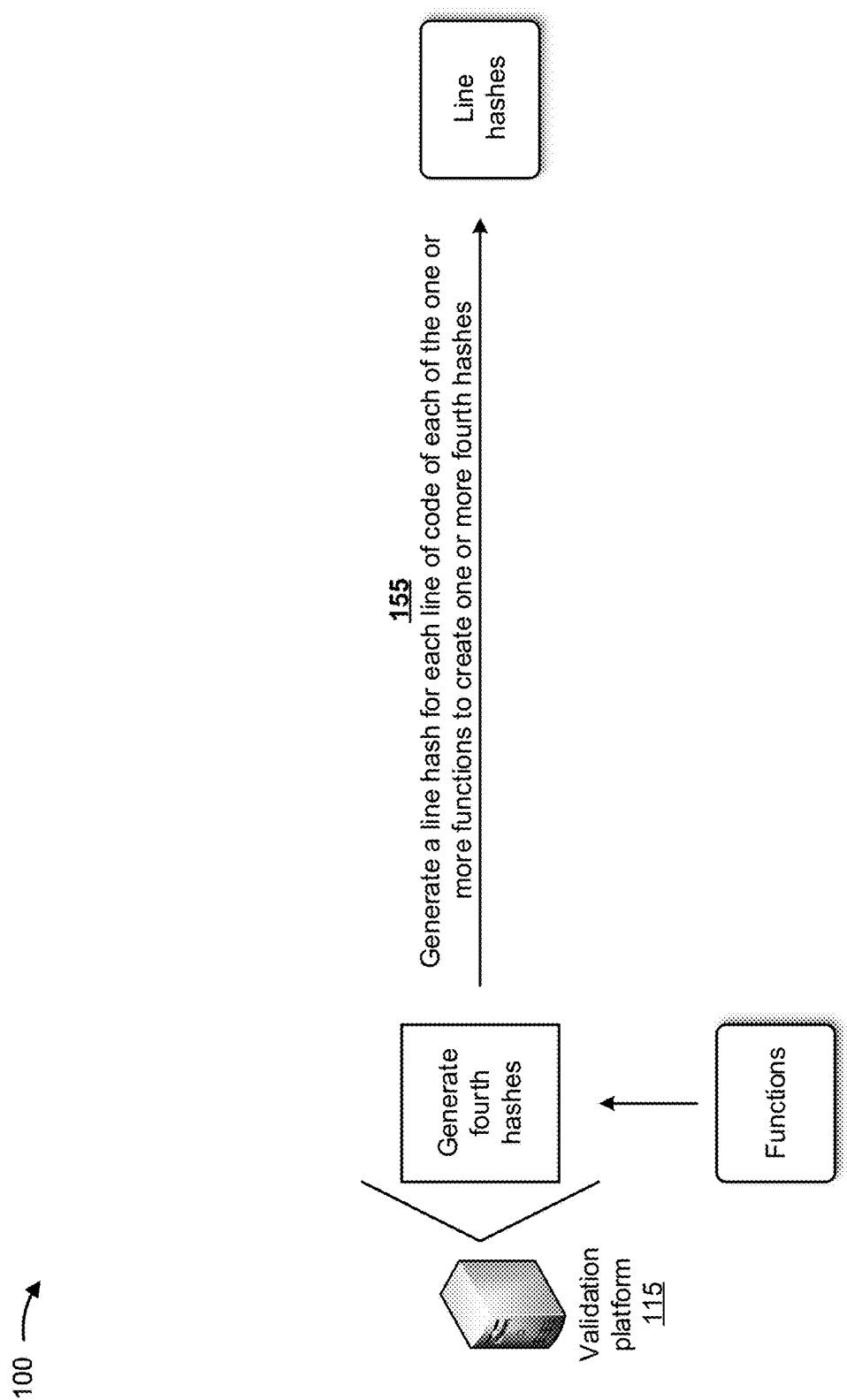

As shown in FIG. 1I, and by reference number 155, in some implementations, validation platform 115 may generate a line hash value for each line of code of each of the one or more functions, to create one or more line hashes. For example, validation platform 115 may apply a hash function to each particular line of code of each function to generate a line hash that is unique to the content of the particular line of code. Thus, if a first line of code of a function is different than a second line code of the function, a line hash assigned to the first line of code will be different than a line hash associated to the second line of code. In some implementations, validation platform may remove non-operable content from the lines (e.g., comments, white spaces, etc.) before calculating the line hash values.

As shown in FIG. 1J, and by reference number 160, validation platform 115 may store, in data structure 112, data identifying the one or more functions, the one or more function hashes, (if used) the one or more line hashes, and status information related to the functions. In some implementations, validation platform 115 may receive or generate one or more unique keys to use as identifiers of the function, for example, based on one or more repositories 110, the one or more applications, and/or the one or more files. For example, if a particular function is included in a particular file of a particular application, and the particular application is included in a particular repository, validation platform 115 may utilize the names of the particular file, the particular application, and the particular repository to generate a unique key for the particular function. Validation platform 115 may associate each unique key with a specific function (and its corresponding function hash value and (if used) line hash values), and may store the associated information in data structure 112. In some implementations, validation platform 115 may also store, in data structure 112, status information data identifying whether the functions have been scanned, whether the functions are approved for use, notations regarding analysis, and/or the like, similar to those described above with respect to files.

As shown in FIG. 1K, an example of data structure 112 may include entries for the unique keys (e.g., in a Unique key column), the functions (e.g., in a Function column), the data identifying whether the functions have been scanned (e.g., in a Scanned column), the data identifying whether the functions are approved for use (e.g., in an Approved column), the function hashes (e.g., in a Function hash value column), and the line hashes (e.g., in a Function line hash value column). For example, the Unique key column may include entries for the unique keys (e.g., Key1 through Keyn); the Function column may include entries for function identifier information associated with each function included in each file of each application included in each repository (e.g., FuncName-1 through FuncName-n); the Scanned column may include entries for scanning indicators indicating whether and how each function was scanned; the Approved column may include entries for approval indicators indicating whether each function is approved to be used; the Function hash value column may include entries for function hash information for the function hashes (e.g., FuncHash-1 through FuncHash-n), and the Function line hash value column may include entries for function line hash information for the line hashes (e.g., Func line 1 hash through Func line n hash). Additional entries may be provided that note reasons for non-approval and/or remedial actions that may be taken to resolve security issues identified.

In some implementations, the function information may include information such as function names, language names, release dates, version numbers, last modified dates, interface information, file information, owner information, and other information about the file. In some implementations, function information includes a unique key as described above, which may be based or embed one or more of the items of information referenced above. In some implementations, the hash value information may include the hash values, the date the hash value was generated, the algorithm used to generate the hash value, and other information about the hash values.

In some implementations, the scanned indicators may indicate whether functions have been scanned and/or may indicate tools that were used to scan the functions (e.g., in a manner similar to that described above in connection with FIG. 1F). In some implementations, the approval indicators may indicate whether functions are approved for use (e.g., in a manner similar to that described above in connection with FIG. 1F). For example, if an approval indicator for a particular function is set to "Yes," then validation platform 115 may assume that the function is safe to be used in any application that uses it, and may automatically set to "Yes" the approval indicators for all functions that have the same function hash as the particular function. In some implementations, the scanned indicators and/or the approval indicators may be protected such that only an individual with security clearance may input or modify the scanned indicators and/or the sharing indicators, and such actions are logged for auditing. Additionally, or alternatively, validation platform 115 may automatically enter or modify the scanned indicators and/or the sharing indicators based on scan results.

In some implementations, the information described in connection with FIG. 1F and FIG. 1K may be combined into a single data structure 112, such that one or more of the file hashes, function hashes, file line hashes and function line hashes are available to be used to do optimized analysis as described herein.

Figure 1L:
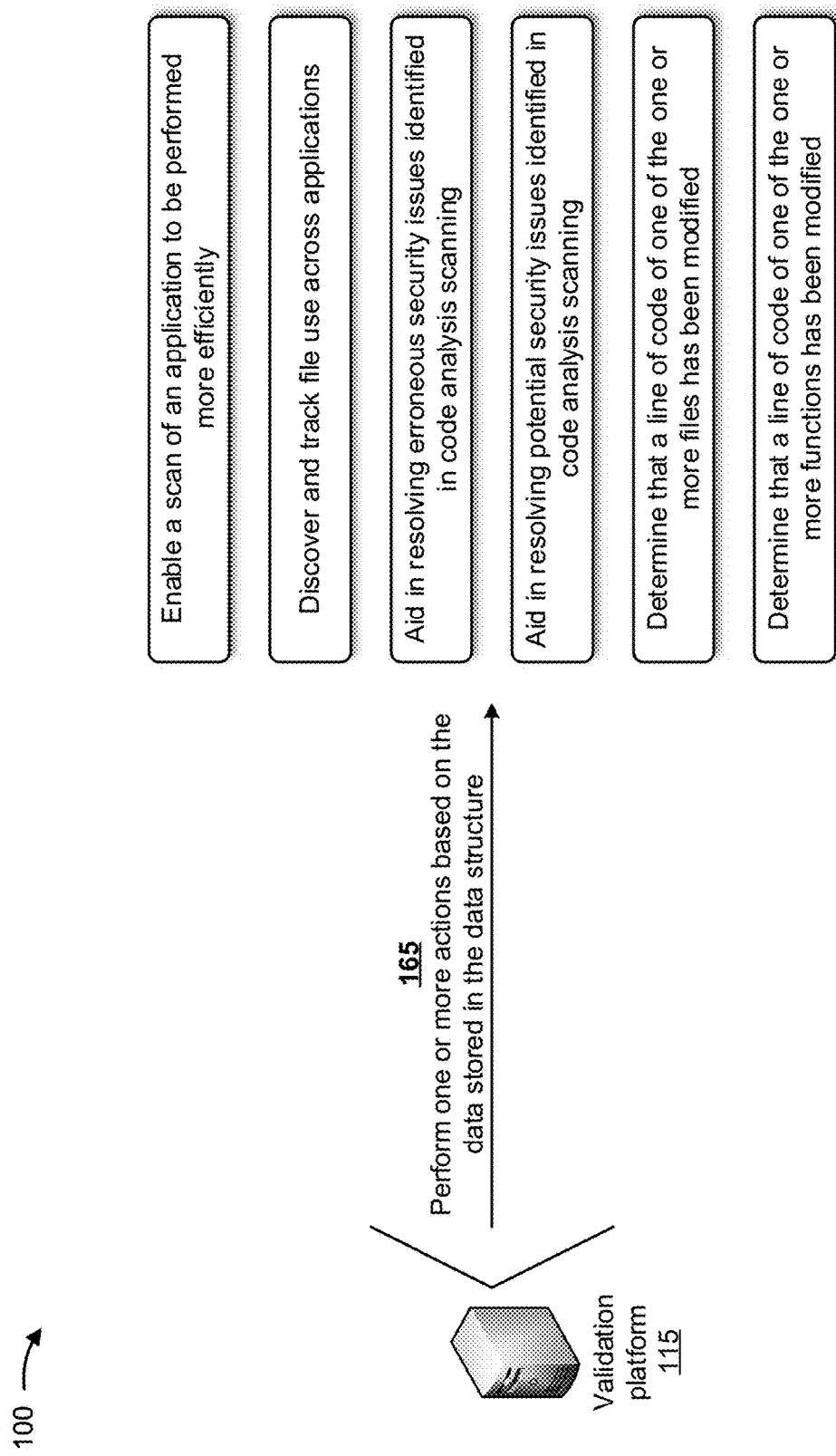

As shown in FIG. 1L, and by reference number 165, validation platform 115 may perform one or more actions using or otherwise based on the data stored in data structure 112. In some implementations, data structure 112 may enable a scan of an application to be performed more efficiently since the hashes associated with the application may be compared to hashes stored in data structure 112. For example, if an application is being scanned and a calculated hash value of one of the files included in such application matches one of the hash values of the files stored in the data structure, validation platform 115 may determine whether results can be provided based on the information already stored in the data structure without scanning the file. For example, if the records associated with the file in data structure 112 include scanned indicators that show the file has been scanned and/or include approval indicators that indicate that the file is approved for use, validation platform 115 may report that the file passes the scan, and may skip performing a scan. If the records associated with the file include scanned indicators that show the file has been scanned and/or include approval indicators that indicate that the file is not approved for use, validation platform 115 may flag the application as such in the scan results and may skip performing the scan. If the records associated with the file include scanned indicators that indicate that the file has not been scanned, or that the scan does not meet a required criteria (e.g., scan was too long ago, different kind of scanning tool was used), validation platform 115 may perform the scan. Where a scan is performed, validation platform 115 may create records for the scanned files in data structure 112, which may include the application information, file information and file hash information described above, and may further include scanned identifiers noting the scanning performed, approved identifiers indicating an approval status, and other information from the scan. The record or information in the record may be identified as preliminary, in order to allow for further scanning or review by authorized security teams to confirm the analysis.

The benefits of this capability increase as the size and quantity of the applications within repositories 110 increase. For example, if one-hundred applications utilize a "shared" application—e.g., "Library X"—that is one megabyte (Mb) in size, validation platform 115 may be able to avoid scanning each instance of use of Library X when it scans at least ninety-nine of the applications the use Library X, resulting in ninety-nine Mb worth of saved application scans.

In some implementations, further efficiencies are achieved by the platform from dealing with modified applications. Continuing the example from above, if the developers of one of the applications decide to substantively modify the Library X shared application being used—now Library X' due to the modification—the hash values generated by at least some of the files of Library X' will not match the hash values of files currently in data structure 112. Validation platform 115 may then perform a static code analysis on the modified files of Library X.' Once that scan is complete, it may then store the results of the scan in records of data structure 112 associated with the modified files of Library X'. If the developers of another application decide they would like to use Library X' in their application, a scan of such application will generate file hash values that match the hash values stored in the data structure 112 for the modified files of Library X' (as well as the unmodified files that originate with Library X), and thus avoid the need for a scan of such files.

In this way, validation platform 115 allows application scans to be expedited since scanning may be skipped for applications that have already been scanned (e.g., are in the data structure) and scan results may be pulled from the data structure. This provides efficiency since most applications reuse code from multiple repositories. Furthermore, if a user utilizes a modified file, validation platform 115 may scan the modified file once, and may store results of the scan in the data structure. If another application uses the modified file, validation platform 115 may skip scanning the other application since the modified filed was previously scanned.

In some implementations, file use across applications may be discovered and tracked. For example, data structure 112 may be queried based on a hash value for a file, and it may be discovered that certain applications have included that specific file. Likewise, if a file has been modified, validation platform 115 may identify applications that utilize the modified file by searching for hash values that have a same hash entry in data structure 112 for the modified file. This may be used, for example, where a vulnerability or other bug has been discovered in a file, and it would be useful to know which applications include the file so that the vulnerability may be remediated.

In some implementations, the one or more actions may include validation platform 115 using the data structure to aid in resolving erroneous security issues identified in code analysis scanning. For example, a scan of a file may report potential security issues that, upon further analysis are not in fact security issues (e.g., "false positives"). A security team may have already vetted the potential security issues and determined them to be insignificant or erroneous detections. The security team may record the results in the record of data structure 112 associated with the scanned file. Future scans of files that generate hash values that match the file hash value stored in the data structure 112 will allow the validation platform to retrieve the record for the file and the approval indicator that indicates approval for use, even though a scan may indicate a security issue. Notations in the record may note the reason for the approval and the finding of a "false positive" scan.

In some implementations, the one or more actions may include validation platform 115 using the data structure 112 to aid in resolving potential security issues identified in code analysis scanning. For example, if a particular file is flagged by a scan as potentially containing a security issue, validation platform 115 may refer to data structure 112 to determine whether code in the particular file has already been examined (e.g., based on generating a hash value for the file and finding a matching hash value in data structure 112). If the record for the file is found in data structure 112, validation platform 115 may use or provide the information in the record—for example, approval indicators or entries identifying remedial actions that were previously taken to eliminate the security issue, which may conserve resources that would otherwise be wasted on taking such actions, on delays that are caused by researching such actions, and/or the like. If the record associated with file in data structure 112 provides no remedial instructions, validation platform 115 may automatically take action (e.g., report the file to a software testing tool, remove the file (and files including identical file hash values) from repositories, mark the files with a designation that a security issue exists, report the issue to a repository owner, include the issue in an application security report, and/or the like), which may prevent security breaches, damage to code, loss of operation, and/or the like, thereby conserving resources associated with applications and systems that utilize the code in the particular file.

In some implementations, the one or more actions may include performing the actions described above, except on a per-function basis. For example, the code scanning may identify functions in applications, generate hash values for the functions, and compare the hash values to those stored in data structure 112. The comparison can be used as part of improving scanning efficiency by avoiding the need to scan reused functions, detecting function use across applications in repositories, improving scan accuracy by identifying potential security issues found in scanning that are not of actual concern, and improving remediation times by identifying remediation actions quickly. Using function hashing may be particularly useful where developers have copied a function of an application and included the function in a new application file that also includes other code. File-based scanning may not find the file to have been previously scanned based on the file hash, but function based scanning may discover the function has already been scanned based on the function hash.

In some implementations, the one or more actions may include validation platform 115 determining that a line of code of one of the one or more files has been modified. For example, validation platform 115 may determine that a file has been modified based on detecting that a file having the same (or similar) file identifiers in data structure 112 is associated with a file hash value that is different than a file hash generated for a file being scanned. For example, file identifiers may include the same file name, but different version information or modification date information. It may be very useful to identify which portions of the file are different in order to focus scanning or remediation on the changed portions of the file. Validation platform 115 may determine a line of code that has changed by determining that the line of code is associated with a line hash value that is different from a line hash value that was calculated for the file being scanned. In this way, validation platform 115 may identify which portions (e.g., which specific lines of code) of the file have changed, which may enable the code to be tested more quickly and efficiently, thereby conserving resources that would otherwise be wasted testing the entire file and/or as a result of delays in testing the entire file.

In some implementations, the one or more actions may include validation platform 115 determining that a line of code of one of the one or more functions has been modified. For example, validation platform 115 may determine that a function has been modified based on detecting that a function having the same (or similar) function identifiers in data structure 112 is associated with a function hash value that is different than a function hash generated for a function being scanned. For example, function identifiers may include the same function name, but different version information or modification date information. It may be useful to identify which portions of the function are different in order to focus scanning or remediation on the changed portions of the function. Validation platform 115 may determine a line of code of the function that has changed by determining that the line of code is associated with a line hash value that is different than a line hash value that was calculated for the line being scanned. In this way, validation platform 115 may identify which portions (e.g., the specific lines of code) of the function have changed, which may enable the code to be tested more quickly and efficiently, thereby conserving resources that would otherwise be wasted testing an entire function and/or as a result of delays in testing the entire function.

In this way, the process for detecting security issues with software applications is improved through the generating an inventory of files and/or functions, including status information regarding static code analysis, and tracking changes to the files and/or the functions including status information regarding static code analysis. The process includes automated scanning, tracking, approval and/or remediation, which may remove human subjectivity and waste from the process, and which may improve speed, accuracy and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that does security analysis of software applications using an inventory of files and/or functions including status information regarding static code analysis, and tracks changes to the files and/or the functions including status information regarding static code analysis in the manner described herein. Finally, the process for generating an inventory of files and/or functions including status information regarding static code analysis, and tracking changes to the files and/or the functions including status information regarding static code analysis conserves computing resources, networking resources, and/or the like that would otherwise be wasted in unnecessarily scanning the same application multiple times, scanning modified applications multiple times, investigation of false positive scan results, and/or the like.

As indicated above, FIGS. 1A-1L are provided merely as examples. Other examples may differ from what was described with regard to FIGS. 1A-1L. The number and arrangement of devices and networks shown in FIGS. 1A-1L are provided as an example. In practice, there may be additional devices and/or networks, fewer devices and/or networks, different devices and/or networks, or differently arranged devices and/or networks than those shown in FIGS.

Figure 2:
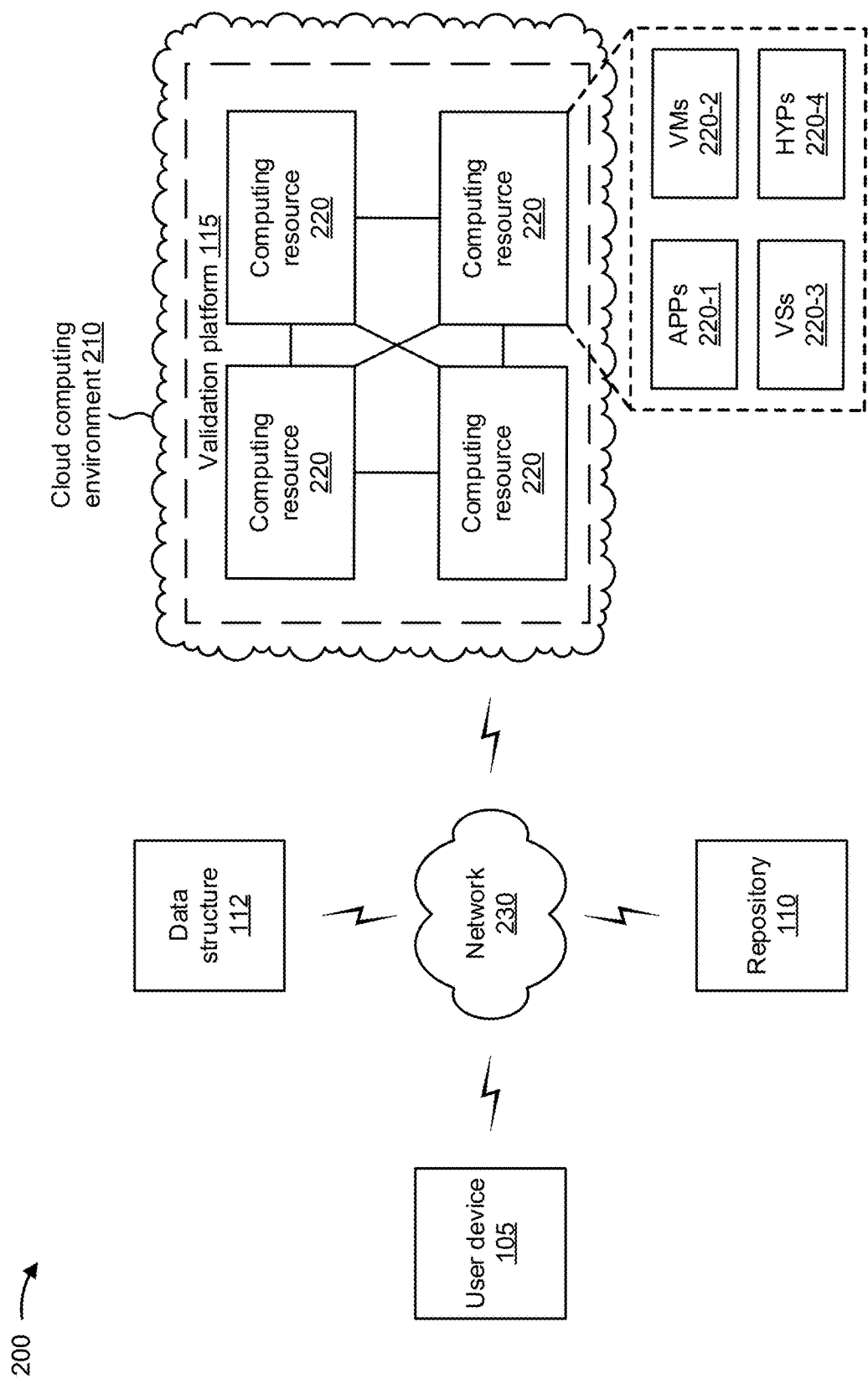
FIG. 2 is a diagram of an example environment in which systems and/or methods described herein may be implemented.

1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) of FIGS. 1A-1L may perform one or more functions described as being performed by another set of devices of FIGS. 1A-1L FIG. 2 is a diagram of an example environment 200 in which systems and/or methods described herein may be implemented. As shown in FIG. 2, environment 200 may include user device 105, repositories 110, data structure 112, validation platform 115, and a network 230. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, user device 105 may receive information from and/or transmit information to repositories 110, data structure 112 and/or validation platform 115.

Repositories 110 and data structure 112 include one or more storage devices capable of receiving, generating, storing, processing, and/or providing information, such as information described herein. For example, repositories 110 and data structure 112 may include a repository, a data warehouse, a database engine, a database, a table, a list, and/or the like. In some implementations, repositories 110 data structure 112 may receive information from and/or transmit information to user device 105 and/or validation platform 115. In some implementations, repositories 110 and/or data structure 112 may be provided in a cloud computing environment.

Validation platform 115 includes one or more devices that generate and utilize an inventory of files and/or functions, as described above. In some implementations, validation platform 115 may be designed to be modular such that certain software components may be swapped in or out depending on a particular need. As such, validation platform 115 may be easily and/or quickly reconfigured for different uses. In some implementations, validation platform 115 may receive information from and/or transmit information to one or more user devices 105 and/or one or more repositories 110 and data structure 112.

In some implementations, as shown, validation platform 115 may be hosted in a cloud computing environment 210. Notably, while implementations described herein describe validation platform 115 as being hosted in cloud computing environment 210, in some implementations, validation platform 115 may not be cloud-based (i.e., may be implemented outside of a cloud computing environment) or may be partially cloud-based.

Cloud computing environment 210 includes an environment that hosts validation platform 115, repositories 110 and/or data structure 112. Cloud computing environment 210 may provide computation, software, data access, storage, etc., services that do not require end-user knowledge of a physical location and configuration of system(s) and/or device(s) that hosts validation platform 115, repositories 110 and/or data structure 112. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host validation platform 115, repositories 110 and/or data structure 112. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with validation platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of validation platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources. Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
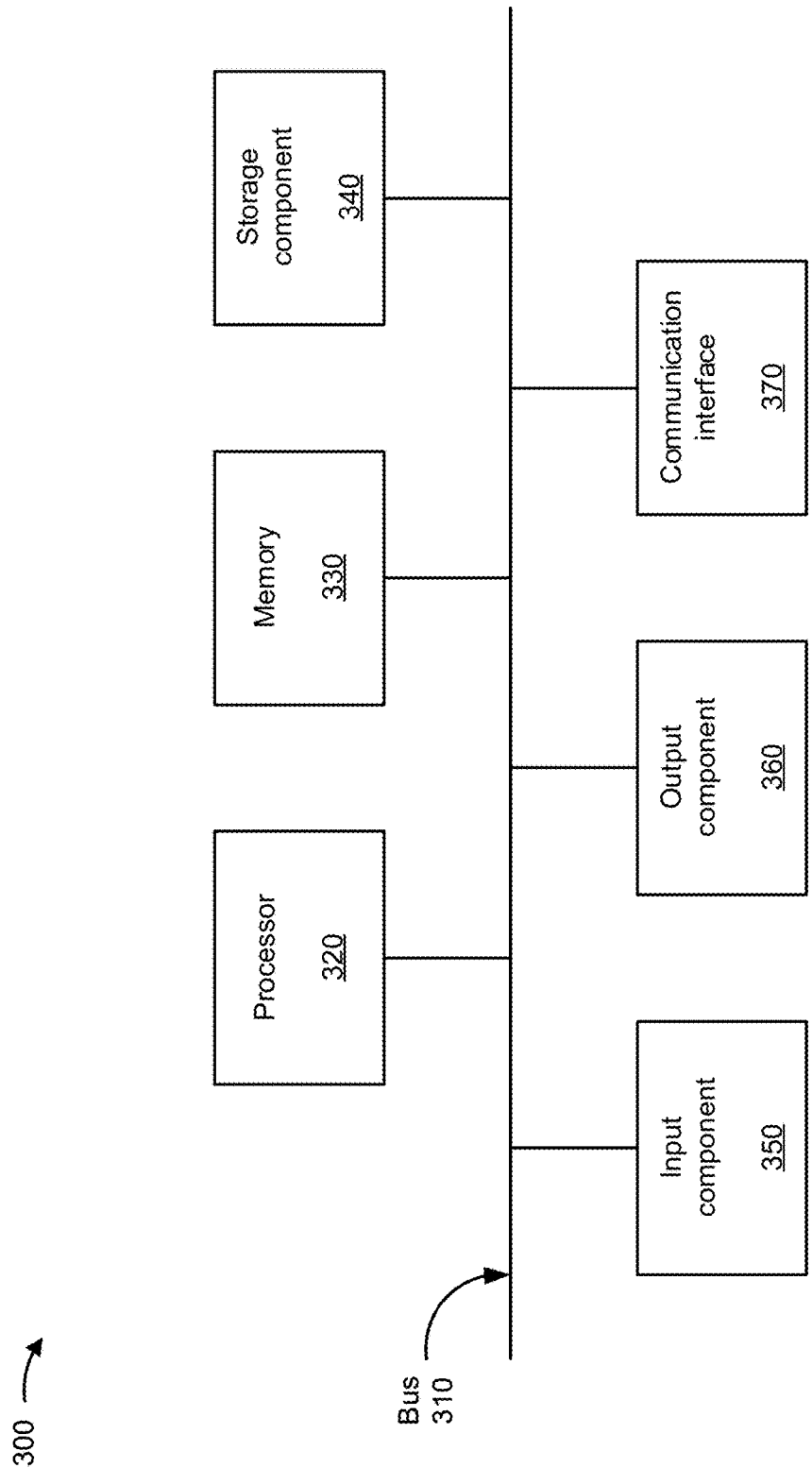
FIG. 3 is a diagram of example components of one or more devices of FIG. 2.

FIG. 3 is a diagram of example components of a device 300. Device 300 may correspond to user device 105, repositories 110, data structure 112, validation platform 115, and/or computing resource 220. In some implementations, user device 105, repositories 110, data structure 112, validation platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400. In some implementations, one or more process blocks of FIG. 4 may be performed by a device (e.g., validation platform 115). In some implementations, one or more process blocks of FIG. 4 may be performed by another device or a group of devices separate from or including the device, such as a user device (e.g., user device 105).

As shown in FIG. 4, process 400 may include receiving data identifying one or more applications, wherein each of the one or more applications includes one or more files (block 410). For example, the device (e.g., using computing resource 220, processor 320, communication interface 370, and/or the like) may receive data identifying one or more applications, as described above. In some implementations, each of the one or more applications may include one or more files.

As further shown in FIG. 4, process 400 may include generating a file hash for each of the one or more files to create one or more file hashes (block 420). For example, the device (e.g., using computing resource 220, processor 320, memory 330, and/or the like) may generate a file hash for each of the one or more files to create one or more file hashes, as described above.

As further shown in FIG. 4, process 400 may include storing, in a data structure, data identifying the one or more applications, the one or more files, and the one or more file hashes, and one or more status indicators associated with the each of the one or more file hashes (block 430). For example, the device (e.g., using computing resource 220, processor 320, storage component 340, and/or the like) may store, in a data structure, data identifying the one or more applications, the one or more files, and the one or more file hashes, and one or more status indicators associated with the each of the one or more file hashes, as described above.

As further shown in FIG. 4, process 400 may include generating a hash associated with a file included in a new application, wherein the new application is not one of the one or more applications (block 440). For example, the device (e.g., using computing resource 220, processor 320, memory 330, storage component 340, and/or the like) may generate a hash associated with a file included in a new application, as described above. In some implementations, the new application may not be one of the one or more applications.

As further shown in FIG. 4, process 400 may include determining that the hash associated with the file included in the new application matches one of the one or more file hashes (block 450). For example, the device (e.g., using computing resource 220, processor 320, memory 330, and/or the like) may determine that the hash associated with the file included in the new application matches one of the one or more file hashes, as described above.

As further shown in FIG. 4, process 400 may include refraining from performing a scan of the file included in the new application based on determining that the hash associated with the file matches one of the one or more file hashes, and based on a status indicator associated with the one of the one or more file hashes (block 460). For example, the device (e.g., using computing resource 220, processor 320, memory 330, storage component 340, and/or the like) may refrain from performing a scan of the file included in the new application based on determining that the hash associated with the file matches one of the one or more file hashes, and based on a status indicator associated with the one of the one or more file hashes, as described above. In some implementations, refraining from performing the scan of the file included in the new application may be based on a status indicator indicating that the file is approved for use, or may be based on a status indicator indicating that the file is not approved for use.

Process 400 may include additional implementations, such as any single implementation or any combination of implementations described below and/or in connection with one or more other processes described elsewhere herein.

In some implementations, process 400 may include storing, as part of the status indicators, one or more scanning indicators indicating a scanning status of the one or more files, and one or more approval indicators indicating an approval status of the one or more files.

In some implementations, process 400 may include determining that the hash associated with the file included in the new application does not match any of the one or more file hashes; performing the scan of the file included in the new application based on determining that the hash associated with the file does not match any of the one or more file hashes; and inserting into the data structure the hash associated with the file and at least one status indicator based on a result of the scan of the file associated with the new application.

In some implementations, process 400 may include generating, for each file of the one or more files, a line hash associated with a line of code included in each file, to create one or more line hashes associated with each file; and storing, in the data structure, the one or more line hashes associated with each file of the one or more files.

In some implementations, process 400 may include identifying one or more functions provided in each of the one or more files; generating a function hash for each of the one or more functions to create one or more function hashes; and storing, in the data structure, data identifying: the one or more is functioning, the one or more is functioning hashes, and one or more is functioning status indicators.

In some implementations, process 400 may include removing non-operable lines of code from the one or more files prior to generating the file hash for each of the one or more files.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, data identifying one or more applications,
wherein each of the one or more applications includes one or more files,
generating, by the device, a file hash for each of the one or more files to create one or more file hashes;
storing, by the device and in a data structure, data identifying:
the one or more applications,
the one or more files,
the one or more file hashes, and
one or more status indicators indicating a status of the each of the one or more file hashes,
wherein the one or more status indicators include one or more scanned indicators indicating a scanning status of the one or more files that provides an indication of whether the one or more files have been previously scanned and one or more approval indicators, with indicating an approval status of the each of the one or more file hashes, that indicate whether the one or more files are approved for use;
generating, by the device, a hash for a file included in a new application,
wherein the new application is not one of the one or more applications;
determining, by the device, that the hash for the file included in the new application matches one of the one or more file hashes,
wherein determining that the hash for the file included in the new application matches one of the one or more file hashes comprises:
determining the new application has a same first hash as the one or more files; and
preventing, by the device, performing a scan of the file included in the new application upon determining that the hash for the file matches one of the one or more file hashes, and upon determining a value of a status indicator of the one or more status indicators.

2. The method of claim 1, wherein preventing the scan of the file included in the new application is based on a status indicator indicating that the file is approved for use.

3. The method of claim 1, wherein preventing, the scan of the file included in the new application is based on a status indicator indicating that the file is not approved for use.

4. The method of claim 1, further comprising:
storing, as part of the status indicators, one or more of:
the one or more scanned indicators indicating the scanning status of the one or more files, and
the one or more approval indicators.

5. The method of claim 1, further comprising:
determining, by the device, that the hash for the file included in the new application does not match any of the one or more file hashes;
performing the scan of the file included in the new application based on determining that the hash for the file does not match any of the one or more file hashes; and
inserting into the data structure the hash for the file and at least one status indicator based on a result of the scan of the file included in the new application.

6. The method of claim 1, further comprising:
generating, for each file of the one or more files, a line hash associated with a line of code included in each file, to create one or more line hashes associated with each file; and
storing, in the data structure, the one or more line hashes associated with each file of the one or more files.

7. The method of claim 1, further comprising:
removing non-operable lines of code from the one or more files prior to generating the file hash for each of the one or more files.

8. A device, comprising:
one or more memories; and
one or more processors, communicatively coupled to the one or more memories, configured to:
receive data identifying one or more applications,
wherein each of the one or more applications includes one or more files,
generate a file hash for each of the one or more files to create one or more file hashes;
store, in a data structure, data identifying:
the one or more applications,
the one or more files,
the one or more file hashes, and
one or more status indicators,
wherein the one or more status indicators include one or more scanned indicators indicating a scanning status of the one or more files that provides an indication of whether the one or more files have been previously scanned and one or more approval indicators, for the each of the one or more file hashes, that indicate whether the one or more files are approved for use;
generate a hash for a file of a new application that is not one of the one or more applications;
determine that the hash for the file of the new application matches one of the one or more file hashes,
wherein the one or more processors, to determine that the hash for the file included in the new application matches one of the one or more file hashes, are configured to:
determine the new application has a same first hash as the one or more files; and prevent performing a scan of the file of the new application upon determining that the hash of the file matches one of the one or more file hashes and upon determining a value of the one or more status indicators.

9. The device of claim 8, wherein the one or more processors are configured to prevent the scan of the file included in the new application based on a status indicator indicating one of that the file is approved for use or the file is not approved for use.

10. The device of claim 8, wherein the one or more processors are further configured to store, as part of the one or more status indicators:
the one or more approval indicators.

11. The device of claim 8, wherein the one or more processors are further configured to:
determine that the hash for the file included in the new application does not match any of the one or more file hashes;
perform the scan of the file included in the new application based on determining that the hash for the file does not match any of the one or more file hashes; and
insert into the data structure the hash for the file and at least one status indicator based on a result of the scan of the file for the new application.

12. The device of claim 8, wherein the one or more processors are further configured to:
generate, for each file of the one or more files, a line hash associated with a line of code included in each file, to create one or more line hashes associated with each file; and
store, in the data structure, the one or more line hashes associated with each file of the one or more files.

13. The device of claim 8, wherein the one or more processors are further configured to:
remove non-operable lines of code from the one or more files prior to generating the file hash for each of the one or more files.

14. The device of claim 8, wherein the one or more processors are further configured to:
identify one or more functions provided in each of the one or more files;
generate a function hash for each of the one or more functions to create one or more function hashes; and
store, in the data structure, data identifying:
the one or more functions,
the one or more function hashes, and
one or more function status indicators.

15. A non-transitory computer-readable medium storing instructions, the instructions comprising:
one or more instructions that, when executed by one or more processors, cause the one or more processors to:
receive data identifying one or more applications, wherein each of the one or more applications includes one or more files,
generate a file hash for each of the one or more files to create one or more file hashes;
store, in a data structure, data identifying:
the one or more applications,
the one or more files,
the one or more file hashes, and
one or more status indicators,
wherein the one or more status indicators include one or more scanned indicators indicating a scanning status of the one or more files that provides an indication of whether the one or more files have been previously scanned and one or more approval indicators, for the each of the one or more file hashes, that indicate whether the one or more files are approved for use;
generate a hash for a file of a new application that is not one of the one or more applications;
determine that the hash for the file of the new application matches one of the one or more file hashes, wherein the one or more instructions, that cause the one or more processors to determine that the hash for the file included in the new application matches one of the one or more file hashes, cause the one or more instructions to:
determine the new application has a same first hash as the one or more files; and
prevent performing a scan of the file of the new application upon determining that the hash of the file matches one of the one or more file hashes and upon determining a value of the one or more status indicators.

16. The non-transitory computer-readable medium of claim 15, wherein the instructions further comprise:
one or more instructions that, when executed by the one or more processors, cause the one or more processors to:
remove non-operable lines of code from the one or more files prior to generating the file hash for each of the one or more files.

17. The non-transitory computer-readable medium of claim 15, wherein the instructions further comprise:
one or more instructions that, when executed by the one or more processors, cause the one or more processors to store as part of the one or more status indicators:
the one or more approval indicators.

18. The non-transitory computer-readable medium of claim 15, wherein the instructions further comprise:
one or more instructions that, when executed by the one or more processors, cause the one or more processors to:
refrain from performing the scan of the file included in the new application based on a status indicator indicating one of that the file is approved for use or the file is not approved for use.

19. The non-transitory computer-readable medium of claim 15, wherein the instructions further comprise:
one or more instructions that, when executed by the one or more processors, cause the one or more processors to:
determine that the hash for the file included in the new application does not match any of the one or more file hashes;
perform the scan of the file included in the new application based on determining that the hash for the file does not match any of the one or more file hashes; and
insert into the data structure the hash for the file and at least one status indicator based on a result of the scan of the file for the new application.

20. The non-transitory computer-readable medium of claim 15, wherein the instructions further comprise:
one or more instructions that, when executed by the one or more processors, cause the one or more processors to:
identify one or more functions provided in each of the one or more files;
generate a function hash for each of the one or more functions to create one or more function hashes; and store, in the data structure, data identifying:
  the one or more functions,
  the one or more function hashes, and
  one or more function status indicators.

\* \* \* \* \*